Figure 1:
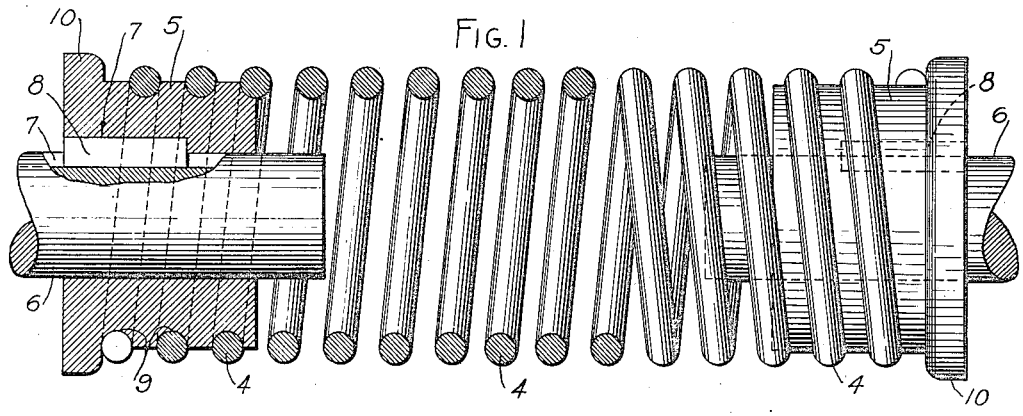

Nov. 6, 1923. 1,472,782

A. E. BARBER

SHAFT COUPLING

Filed Jan. 29, 1920

INVENTOR
ALBERT E. BARBER
BY Benjamin, Roodhouse & Lundy
ATTYS.

Patented Nov. 6, 1923.

1,472,782

UNITED STATES PATENT OFFICE.

ALBERT E. BARBER, OF CHICAGO, ILLINOIS.

SHAFT COUPLING.

Application filed January 29, 1920. Serial No. 354,849.

*To all whom it may concern:*

Be it known that I, ALBERT E. BARBER, a citizen of the United States, and a resident of Chicago, in the county of Cook and State of Illinois, have invented certain new and useful Improvements in Shaft Couplings, of which the following is a full, clear, and exact description.

My present invention relates to improvements in shaft-couplings, and has special reference to improvements in the variety of shaft-couplings illustrated and described in a prior United States Letters Patent No. 1,150,483, issued to me on August 15th, 1915, in which Letters Patent the coupling member consists of a helical spring the end convolutions of which are somewhat reduced in diameter and given other than a circular shape to correspond with and assemble with shafting having similarly shaped cross-section.

In practicing the invention described in the above-mentioned Letters Patent I have found that it is not always desirable to machine the shafting so as to secure ends thereon of other than a circular cross-section. In order to obviate this necessity I have employed what may be described as bushings that are centrally bored to receive shafting of circular cross-section and which bushings I secure to the shafting in any suitable manner such as by providing slots, or splineways, or key-ways in the ends of the shafting and the bushings for the receipt of a key or wedge to prevent any relative rotative movement between the parts.

In the employment of such bushings I have found that it is unnecessary to give the other faces thereof other than a circular configuration, but that if the bushing is made slightly larger than the normal bore or internal diameter of the ends of the helix so as to develop some degree of friction between the bushing and the helix, the rotation of the shaft in the direction of the convolutions of the helix will twist or wind up the helix thereby reducing its internal diameter and causing it to grip the bushing tighter and tighter as more power is applied in the rotation of the shaft.

While the above-noted phenomenon will be developed with bushings of a plain cylindrical exterior, the action will be enhanced by threading the exterior of the bushing to receive the convolutions of the spiral so as to give to the wire or rod more surface contact, and the friction may be still further enhanced by providing threads of an angular or V-shaped section in which the convolutions of the helix will wedge or jam as they contract around the bushing.

I have been able to still further increase the efficiency of my coupling by employing with such bushings as above referred to, both an interior and an exterior helix the windings or convolutions of which are in opposite directions. The end portions of the interior helix are seated in interiorly threaded enlargements of the central bores of the bushings, and being wound in opposite direction to the exterior helix they tend to unwind and spread when the shaft is rotated in the direction of winding of the outer helix, and their grip upon the bushing is thereby increased.

I attain the objects above outlined by means of the structure diagrammatically illustrated in the accompanying drawings, in which, Figure 1 is an elevation partially in section of a helical shaft-coupling provided with end bushings for its ready assembly with shafting.

Figure 2:
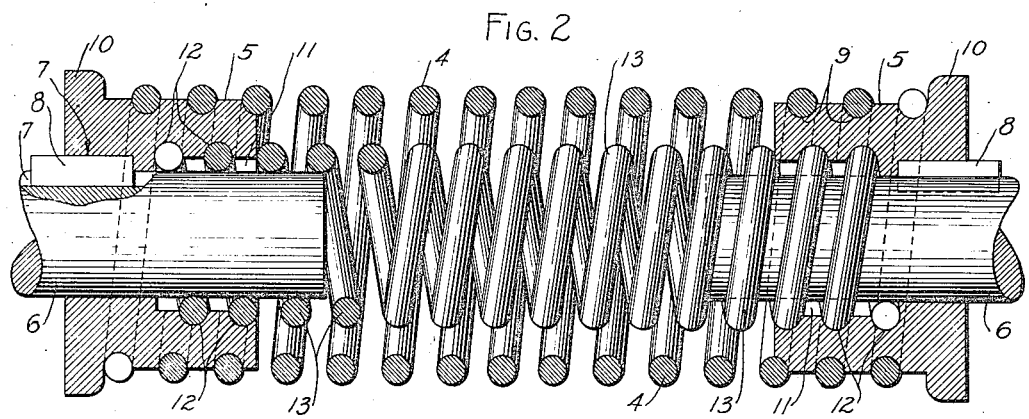
Figure 3:
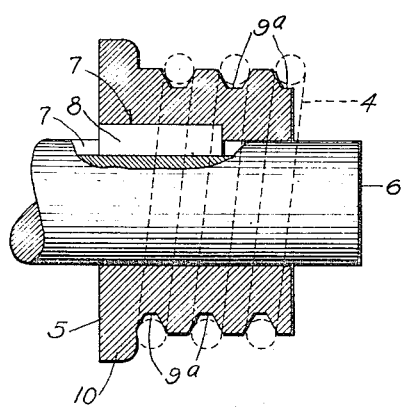

Figure 2 is a fragmental longitudinal section of a shaft-coupling with both external and internal spirals or helices, showing one manner of assembly of the bushings with shafting, and Figure 3 is a central section of an end bushing showing the same provided with threading or angular or V-section for receiving the convolutions of a helical coupling.

In the accompanying drawings similar reference characters have been employed through the several views to designate similar parts.

The coupling proper consists of a helix of wire or rod 4, which is of suitable sectional dimensions to transmit the power employed in the particular place to which it is applied. Into the ends of such helix are fitted blocks or bushings 5, 5, which are centrally bored for the receipt of shafting 6. These bushings may be secured to their respective shafts by providing in both the shafts and the bushings suitable keyways 7, 7, for the receipt of a key or wedge 8.

The exterior of the bushings are, preferably, cylindrical in form, and are provided with threading 9, 9, to receive the end convolutions of the helix. The threading may be of a simi-cylindrical section, as shown in Figures 1 and 2, which gives a maximum surface contact with the convolutions of the helix, or they may be of an angular or V-section as seen at 9ª in Figure 3 of the drawings. Upon the rotation of the shaft 6 in the direction of the winding of the helix the convolutions tend to move nearer together and the individual convolutions tend to wind up and become smaller, that is, of less diameter. This action causes the convolutions of the helix which are in engagement with the ends bushings to grip said bushings with a force which increases with the increase of power employed in rotating the shaft.

I prefer to make the bushings with a laterally extending or annular shoulder 10, 10, against which the ends of the helix abuts, so that the ends of the helix will be to an extent covered and protected from accidental engagement with foreign objects such as the workman's clothing, tools and the like.

In the form of construction shown in Figure 2 of the drawings I have enlarged the inner portion of the central bore of the bushings at 11, 11, and I have interiorly threaded these enlarged portions of the bore as at 12, 12, to receive the end convolutions of an interior or inner helix 13, which is wound in an opposite direction to the windings of the exterior helix 4. This opposite direction of winding of the interior helix will cause the same to expand when the shafting is rotated in the direction of winding of the exterior helix thereby causing the interior helix to grip the enlarged interior bore of the bushing.

It will now be clearly perceived from the foregoing description, taken in connection with the accompanying drawings, that I have utilized the natural and inevitable action of a helical coupling for assembling therewith end bushings by means whereof the assembly of shafting is greatly facilitated. It will also be obvious to persons skilled in this art that modifications of the structure disclosed are possible without materially departing from the spirit of my invention as set forth in the appended claim, and I desire it understood that such changes are contemplated within the scope of such claim.

Having described my invention, what I claim as new and desire to secure by Letters Patent of the United States is:—

A shaft-coupling comprising exterior and interior oppositely winding helical springs, centrally bored and interiorly and exteriorly threaded bushings for receiving and having frictional engagement solely with the convolutions at the end of said helices, said central bore adapted to receive shafting, and means for preventing relative rotative movement between the shafting and bushings when the same are assembled.

Signed at Chicago, county of Cook and State of Illinois, this 22d day of January, 1920.

ALBERT E. BARBER.

Witnesses:
 BENJ. T. ROODHOUSE,
 E. K. LUNDY, Jr.